(12) United States Patent
Vidito

(10) Patent No.: US 11,376,684 B2
(45) Date of Patent: Jul. 5, 2022

(54) WELDING TORCH

(71) Applicant: Jesse Vidito, Visalia, CA (US)

(72) Inventor: Jesse Vidito, Visalia, CA (US)

(*) Notice: Subject to any disclaimer, the term of this patent is extended or adjusted under 35 U.S.C. 154(b) by 314 days.

(21) Appl. No.: 16/537,562

(22) Filed: Aug. 10, 2019

(65) Prior Publication Data

US 2020/0047276 A1 Feb. 13, 2020

Related U.S. Application Data

(60) Provisional application No. 62/717,903, filed on Aug. 12, 2018.

(51) Int. Cl.
*B23K 9/16* (2006.01)
*B23K 9/32* (2006.01)
*B23K 9/167* (2006.01)

(52) U.S. Cl.
CPC .............. *B23K 9/164* (2013.01); *B23K 9/167* (2013.01); *B23K 9/325* (2013.01)

(58) Field of Classification Search
CPC . B23K 9/164; B23K 9/00; B23K 9/16; B23K 9/167; B23K 9/325; B23K 9/04; B23K 35/38; B23K 9/32
See application file for complete search history.

(56) References Cited

U.S. PATENT DOCUMENTS

| | | | | |
|---|---|---|---|---|
| 4,450,339 A | * | 5/1984 | Corby, Jr. ............ | B23K 9/0956 219/124.34 |
| 4,531,040 A | * | 7/1985 | Nawa ..................... | B23K 9/167 219/136 |
| 6,586,708 B1 | * | 7/2003 | Cusick, III ............. | B23K 9/285 219/137.62 |
| 2009/0277878 A1 | * | 11/2009 | Fessl ..................... | B23K 9/285 219/74 |
| 2012/0152927 A1 | * | 6/2012 | Hung ..................... | B23K 9/285 219/137.62 |

* cited by examiner

*Primary Examiner* — Brian W Jennison
(74) *Attorney, Agent, or Firm* — Michael B. Dodd; Bold IP, PLLC

(57) ABSTRACT

Disclosed is a welding torch. The welding torch comprising a torch head, a cup, a handle and a connector removably. Further, the torch head comprising a first tube, a second tube and an extension member. Further, the first tube and the second tube joined together in parallel along the length of the first tube and the second tube. Further, the extension member coupled to a rear end of the second tube. Further, the cup removably coupled to a front end of the first tube. Further, the handle removably coupled to the rear end of the extension member. Further, the connector removably enclosed within the handle. Further, the connector connects to a gas supply hose, wherein the welding torch is generally parallel to the gas supply hose.

18 Claims, 5 Drawing Sheets

WELDING TORCH

RELATED APPLICATION(S)

Under provisions of 35 U.S.C. § 119e, the Applicant(s) claim the benefit of U.S. provisional application No. 62/717,903, filed on Aug. 12, 2018, which is incorporated herein by reference.

FIELD OF THE INVENTION

The invention relates generally to welding equipment, and in particular to an improved Tungsten Inert Gas (TIG) welding torch.

BACKGROUND OF THE INVENTION

Traditionally, a tungsten inert gas (TIG) welding torch is configured in a shape similar to number 7 with a right-angle design, and points away from the operator. The electrode of the TIG must maintain a distance of no more than 0.125 inch from the welding surface, and the operator must also feed his own wire with his free hand, unlike other types of welding torches that feed wire automatically. It is very important for the operator to have an unobstructed field of view of the welding surface, with a torch designed to point away from the operator.

Accordingly, there is a need for an improved TIG that may overcome one or more of the abovementioned problems and/or limitations.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some embodiments, the present disclosure relates to a welding torch. The welding torch comprising a torch head, a cup, a handle and a connector removably. Further, the torch head comprising a first tube, a second tube and an extension member. Further, the first tube and the second tube joined together in parallel along the length of the first tube and the second tube. Further, the extension member coupled to a rear end of the second tube. Further, the cup removably coupled to a front end of the first tube. Further, the handle removably coupled to the rear end of the extension member. Further, the connector removably enclosed within the handle. Further, the connector connects to a gas supply hose, wherein the welding torch is generally parallel to the gas supply hose.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
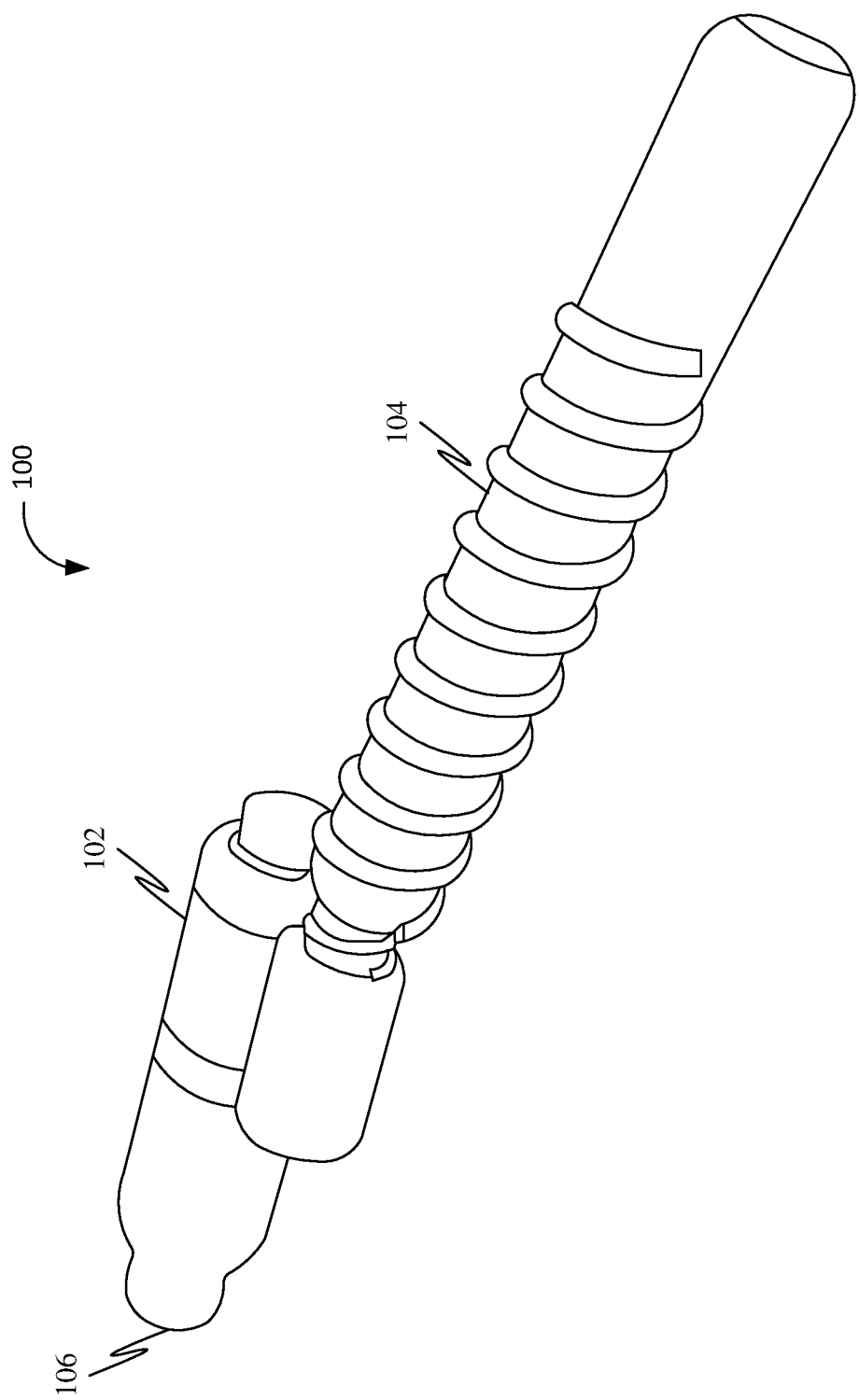
FIG. 1 is a rear right-side perspective view a welding torch, in accordance with an exemplary embodiment.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of welding torches, embodiments of the present disclosure are not limited to use only in this context.

OVERVIEW

According to some embodiments, the present disclosure may describe a welding torch. The torch provides a torch head and ceramic cup which rotate on top of a handle, and can be locked into position at any angle, starting from a position which may be parallel with the gas supply hose. The torch further eliminates the gas flow control knob from the design, relying instead on an electronic solenoid control valve, which may be built into the welder. The overall result may be a substantially improved physical posture and field of vision for the user, enhancing productivity. For example, the welding torch may be Tungsten Inert Gas (TIG) welding torch.

Further, the welding torch may direct a TIG welding flaming in different directions relative to the operator, and provide an unobstructed field of view. Further, the TIG welding torch with a torch body that exists in a singular linear plane and may be absent of any acute or right angles.

According to some embodiments, a modified welding torch is disclosed. The welding torch gives the operator a wider range of visibility, leading to greater safety and more flexible positioning. This allows the operator to maintain a more natural and ergonomic body posture. Also, the increase in field of view increases productivity. Less time may be spent getting into the right position so that the operator can see what he is doing, and a more comfortable position means the operator will not tire as quickly, and can maintain a higher rate of production for longer periods. In the trade of sanitary stainless steel, the operator may be most likely working in an industrial food or pharmaceutical processing facility where the process runs non-stop, around the clock, to produce food and medicine globally. When that process breaks down, a very valuable inventory sits idle, much of which has only a few hours at best before it becomes unsuitable for human consumption.

The disclosed wielding torch works by eliminating blind spots for the TIG welder operator, which are created by a traditional design through its physical occupation of two planes, intersecting perpendicularly. The absence of a gas flow control knob simplifies the overall design of the torch body, and also simplifies the welding process itself by utilizing the electronic solenoid control valve, which may be built into the welder. This valve may be programmed to open when the operator strikes a welding arc, and provides a timed amount of post flow after the operator tails off.

Figure 2:
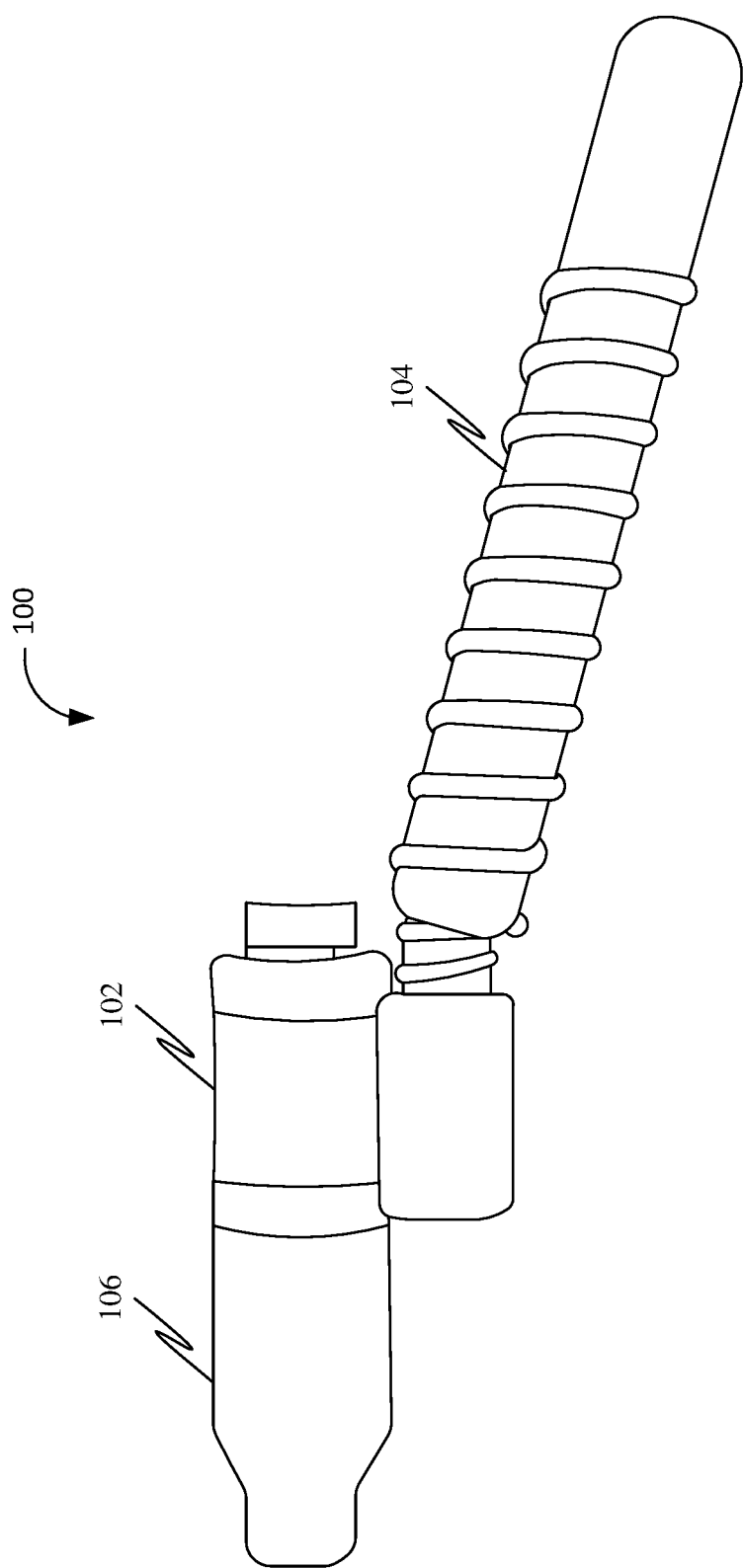
FIG. 2 is a right side view of the welding torch, in accordance with an exemplary embodiment.
Figure 3:
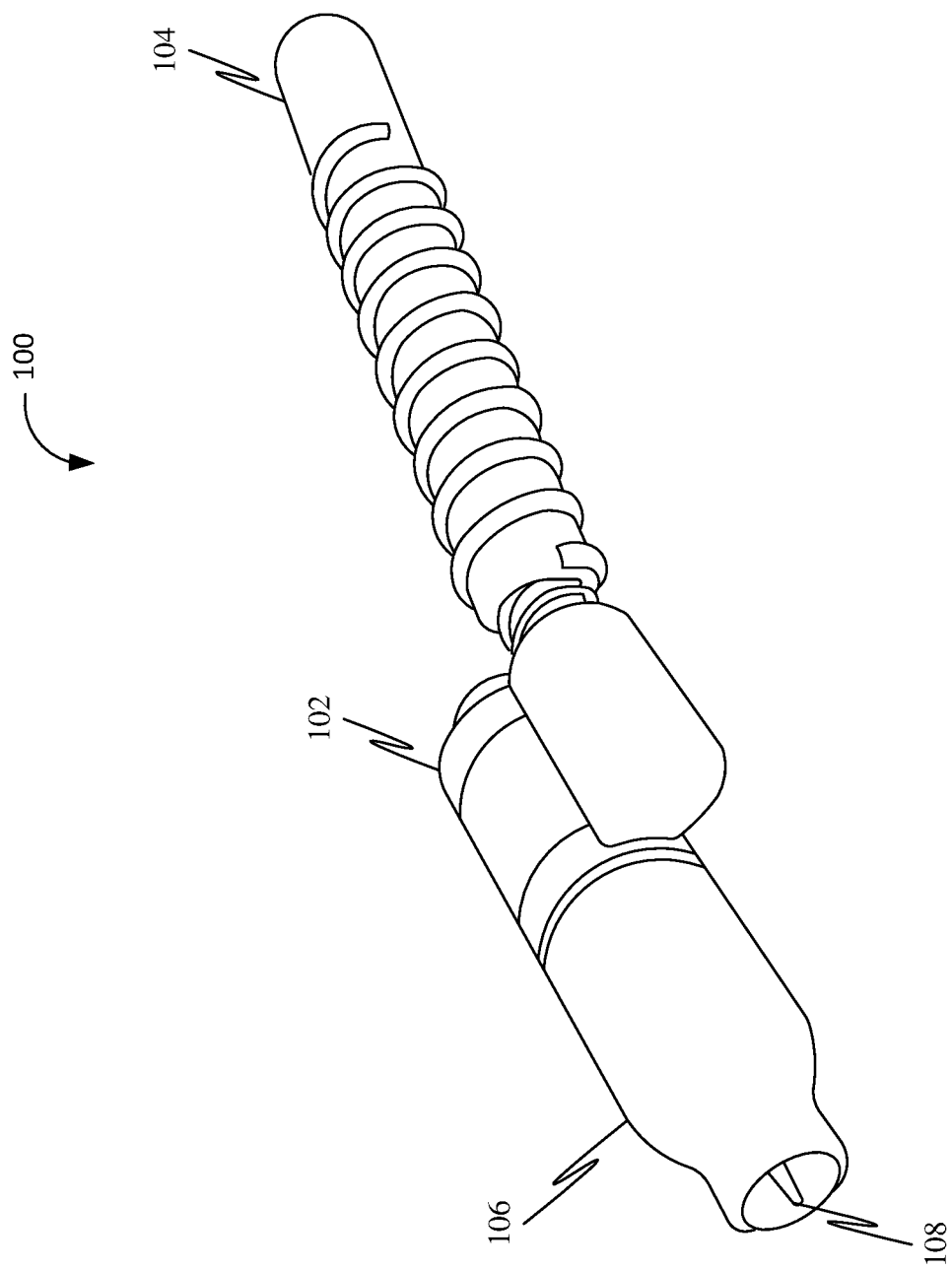
FIG. 3 is a front right-side perspective view of the welding torch, in accordance with an exemplary embodiment.
Figure 4:
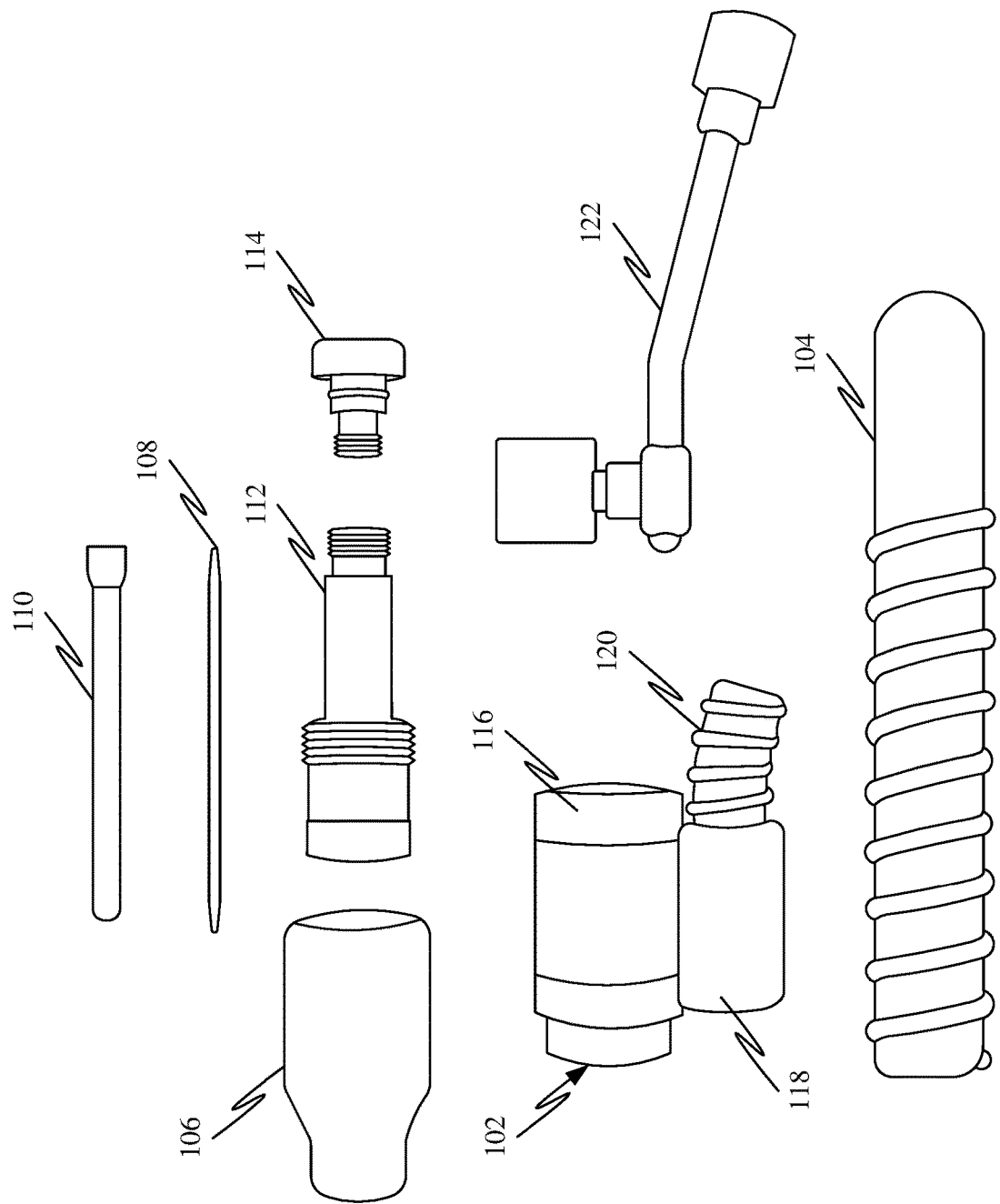
FIG. 4 is an exploded view of the welding torch, in accordance with an exemplary embodiment.
Figure 5:
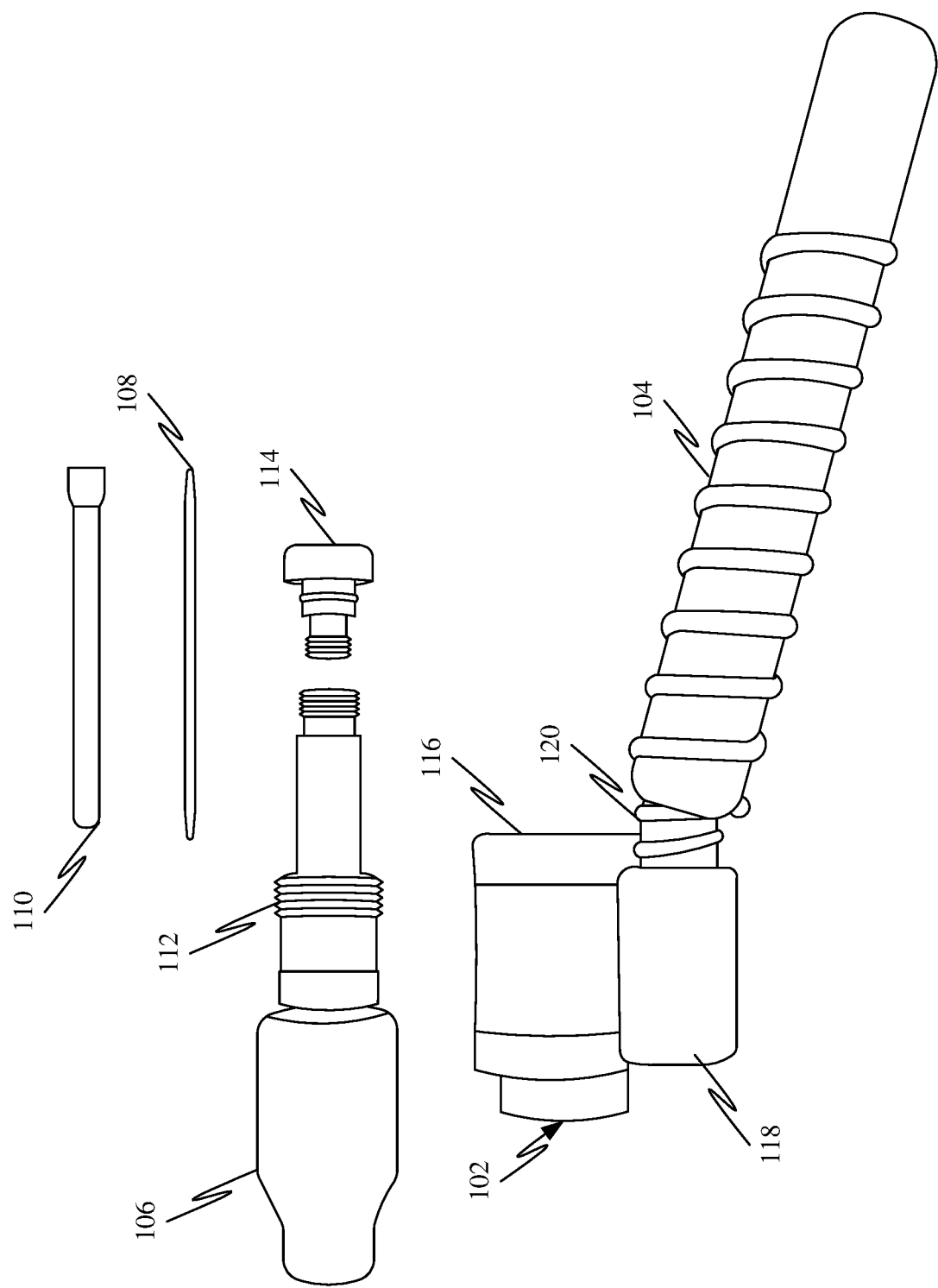
FIG. 5 is an exploded view of the welding torch, in accordance with an exemplary embodiment.

FIG. 1 is a rear perspective view of a welding torch 100, displaying a torch head 102, a handle 104, and a cup 106. FIG. 2 is a side view of the welding torch 100, displaying the torch head 102, the handle 104, and the cup 106. FIG. 3 is a front perspective view of the welding torch 100, displaying the torch head 102, the handle 104, the cup 106, and a tungsten element 108. FIG. 4 is a side exploded view of the welding torch 100 when fully disassembled, displaying the torch head 102, the handle 104, the cup 106, the tungsten element 108, a collet 110, a gas lens 112, a rear cap 114, and a connector 122. FIG. 5 is a side exploded view of the welding torch 100 when partially disassembled, displaying the torch head 102, the handle 104, the cup 106, the tungsten element 108, the collet 110, the gas lens 112, and the rear cap 114.

According to some embodiments, the welding torch 100 may include the torch head 102, the cup 106, the handle 104 and the connector 122. The torch head 102 may include a first tube 116, a second tube 118 and an extension member 120. Further, the first tube 116 and the second tube 118 may be joined together in parallel along the length of the first tube 116 and the second tube 118. Further, the extension member 120 may be coupled to a rear end of the second tube 118. Further, at least one of the first tube 116 and second tube 118 may be generally cylindrical shaped.

Further, the cup 106 may be removably coupled to a front end of the first tube 116. Further, the cup 106 may be tubular shaped. Further, the cup 106 may taper from the rear end of the cup 106 to the front end of the cup 106. Further, the diameter of the cup 106 may decrease from the rear end of the cup 106 to the front end of the cup 106. Further, the cup 106 may be made ceramic material.

Further, the handle 104 may be removably coupled to the rear end of the extension member 120. Further, the handle 104 may be tubular shaped. Further, the outer surface of the handle 104 may include a gripping surface.

Further, the connector 122 may removably enclosed within the handle 104, wherein the connector 122 connects to a gas supply hose. Further, the connector 122 comprises a valve. Further, the welding torch 100 may be generally parallel to the gas supply hose. Further, the welding torch 100 may comprise a flow path for a gas from the gas supply hose to the cup 106. Further, the flow path comprises at least one of the gas supply hose, the handle 104, the second tube 118, the first tube 116 and the cup 106. Further, each of the first tube 116 and the second tube 118 comprises a hole on the side wall to allow the gas to travel from the gas supply hose to the cup 106.

Further, the gas lens 112 may be fitted within the first tube 116, wherein a front end of the gas lens 112 is connected to the cup 106, wherein the rear end of the gas lens 112 is connected to a rear cap 114, wherein the cup 106 and the rear cap 114 securely retain the gas lens 112 within the first tube 116. Further, the gas lens 112 may be tubular shaped. Further, the gas lens 112 may taper from the front end of the gas lens 112 towards the rear end of the gas lens 112. Further, the diameter of the gas lens 112 decreases from the front end of the gas lens 112 towards the rear end of the gas lens 112. Further, the gas lens 112 may be configured to provide a laminar gas flow to the cup 106.

Further, the collet 110 may be fitted within the gas lens 112. Further, the tungsten element 108 may be fitted within the collet 110. Further, a front end of the tungsten element 108 may be exposed from the front end of the cup 106. Further, the length of each of the collet 110, the tungsten element 108 and the gas lens 112 may be approximately same. Further, the collet 110 may be tubular shaped, wherein a front end of the collet 110 may be open and a rear end of the collet 110 may be closed. Further, the tungsten element 108 may be fitted within the collet 110 through the open front end of the collet 110. Further, the collet 110 may form a collar around the tungsten element 108 to securely hold the tungsten element 108.

Further, the tungsten element 108 is generally cylindrical shaped with tapered ends. Further, the welding torch 100 may include an electrical connection providing electricity to the tungsten element 108.

The various components, component sizes, and materials mentioned above are preferable, but artisans will recognize that alternate components and materials could be selected without altering the scope of the invention.

Although the invention has been explained in relation to its preferred embodiment, it is to be understood that many other possible modifications and variations can be made without departing from the spirit and scope of the invention.

What is claimed is:

1. A welding torch comprising:
    a torch head comprising a first tube, a second tube and an extension member, wherein the first tube and the second tube are joined together in parallel along the length of an attachment between the first tube and the second tube, wherein the extension member is coupled to a rear end of the second tube;
    a cup removably coupled to a front end of the first tube;
    a handle removably coupled to the rear end of the extension member;
    a gas supply hose connector removably enclosed within the handle;
    a rear cap;
    a gas lens fitted within the first tube, wherein one end of the gas lens is connected to the cup, wherein another end of the gas lens is connected to the rear cap, and wherein the cup and the rear cap securely retain the gas lens within the first tube;
    a collet fitted within the gas lens; and
    a tungsten element fitted within the collet, wherein a front end of the tungsten element is exposed from the front end of the cup.

2. The welding torch of claim 1, further comprising a flow path for a gas from the gas supply hose to the cup, wherein the flow path comprises at least one of the gas supply hose, the handle, the second tube, the first tube and the cup.

3. The welding torch of claim 1, wherein each of the first tube and the second tube comprises a hole on the side wall to allow the gas to travel from the gas supply hose to the cup.

4. The welding torch of claim 1, wherein at least one of the first tube and second tube is generally cylindrical shaped.

5. The welding torch of claim 1, wherein the cup is tubular shaped.

6. The welding torch of claim 1, wherein the cup tapers from the rear end of the cup to the front end of the cup, wherein the diameter of the cup decreases from the rear end of the cup to the front end of the cup.

7. The welding torch of claim 1, wherein the gas lens is tubular shaped.

8. The welding torch of claim 7, wherein the gas lens tapers from the front end of the gas lens towards the rear end of the gas lens, wherein the diameter of the gas lens decreases from the front end of the gas lens towards the rear end of the gas lens.

9. The welding torch of claim 1, wherein the gas lens is configured to provide a laminar gas flow to the cup.

10. The welding torch of claim 1, wherein the length of each of the collet, the tungsten element and the gas lens is approximately same.

11. The welding torch of claim 1, wherein the collet is cylindrical shaped, wherein a front end of the collet is open and rear end of the collet is closed, wherein the tungsten element is fitted within the collet through the open front end of the collet.

12. The welding torch of claim 1, wherein the collet forms a collar around the tungsten element to securely hold the tungsten element.

13. The welding torch of claim 1, wherein the tungsten element is generally cylindrical shaped with tapered ends.

14. The welding torch of claim 1, further comprising an electrical connection providing electricity to the tungsten element.

15. The welding torch of claim 1, wherein the handle is tubular shaped.

16. The welding torch of claim 1, wherein the the handle comprises a gripping surface.

17. The welding torch of claim 1, wherein the connector comprises a valve.

18. The welding torch of claim 1, wherein the cup includes ceramic material.

* * * * *